INVENTOR.
EDWIN G. GAGE
ATTORNEY.

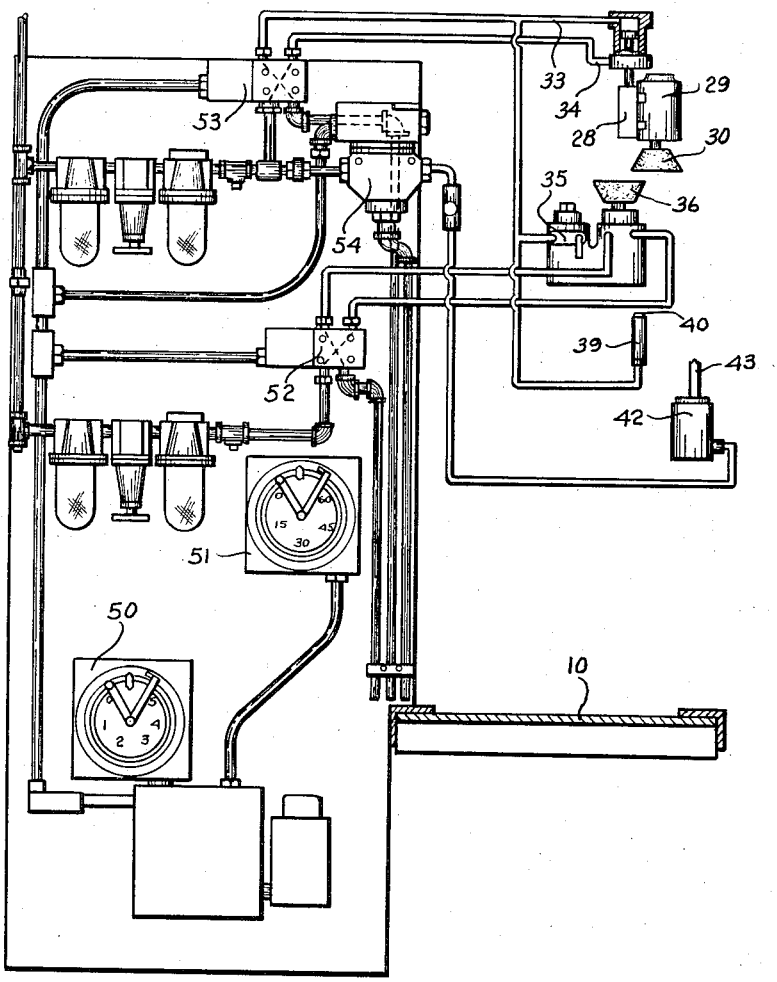
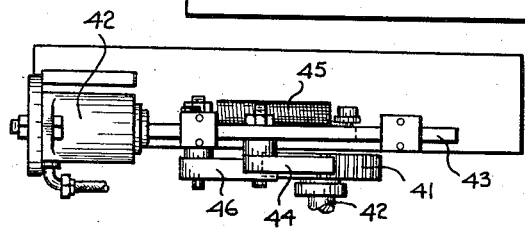
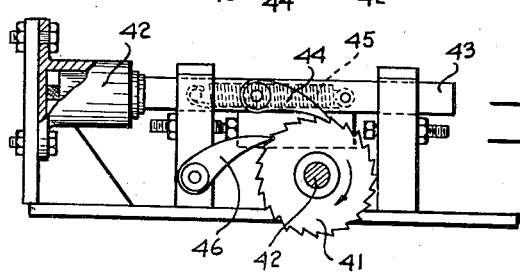

March 31, 1959   E. G. GAGE   2,879,633
SHARPENING DEVICE FOR CUTTING WHEEL
Filed Dec. 4, 1956   5 Sheets-Sheet 5
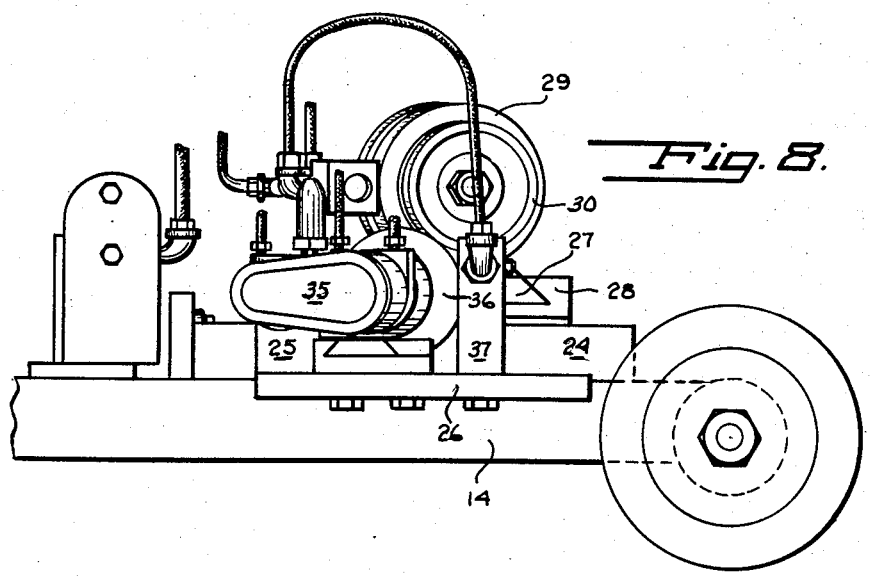
Fig. 8.
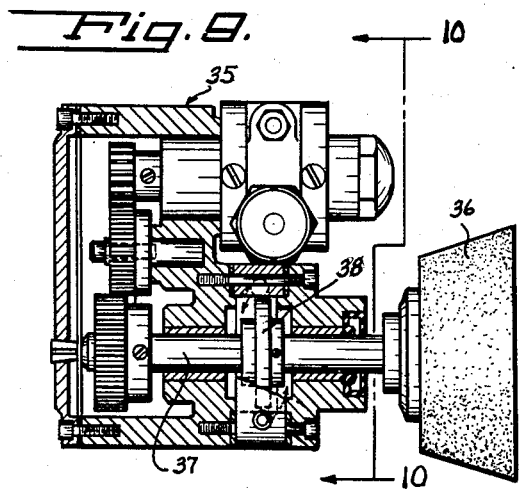
Fig. 9.
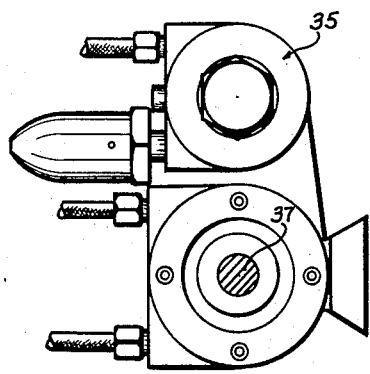
Fig. 10.
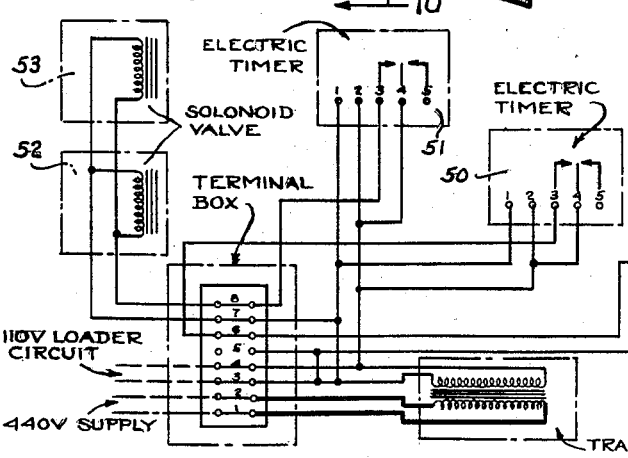
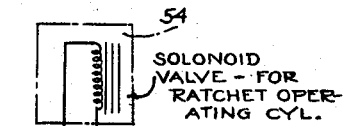
Fig. 11.
INVENTOR.
EDWIN G. GAGE
BY
Raymond A. Paquin
ATTORNEY.

United States Patent Office 2,879,633
Patented Mar. 31, 1959

2,879,633

SHARPENING DEVICE FOR CUTTING WHEEL

Edwin G. Gage, Gilbertville, Mass., assignor to Gilbertville Woven Label Corporation, Gilbertville, Mass., a corporation of Massachusetts Application December 4, 1956, Serial No. 626,126

5 Claims. (Cl. 51—247)

This invention relates to new and useful improvements in sharpening devices and has particular reference to a device for sharpening rotary cutters adapted for automatic cutting machines such as shown in my Patent No. 2,752,999.

An object of the invention is to provide new and improved means for automatically sharpening rotary cutters without removing the cutters from operative position in the cutting machine.

Another object is to provide sharpening means of the type set forth which allows the sharpening of either one side or both sides of the cutter as desired, and also allows the sharpening of both sides of the cutter simultaneously.

Another object is to provide an apparatus of the type set forth wherein the sharpening means will operate automatically at predetermined intervals to sharpen the cutter during its normal operation.

Other objects and advantages of the invention will be apparent from the following description taken in connection with the accompanying drawings. It will be understood that changes may be made in the details of construction and arrangement of parts shown and described without departing from the spirit of the invention as set forth in the accompanying claims, as the preferred form has been given by way of illustration only.

Referring to the drawings:

Fig. 5 is a schematic view of the apparatus;

Fig. 6 is a top view of the adjusting mechanism;

Fig. 7 is a front view of the mechanism shown in Fig. 6;

Fig. 8 is a fragmentary side view of the apparatus;

Fig. 9 is a sectional view of one of the sharpening members;

Fig. 10 is a sectional view taken on line 10—10 of Fig. 9 looking in the direction of the arrows; and Fig. 11 is a schematic wiring diagram of the apparatus.

Figure 1:
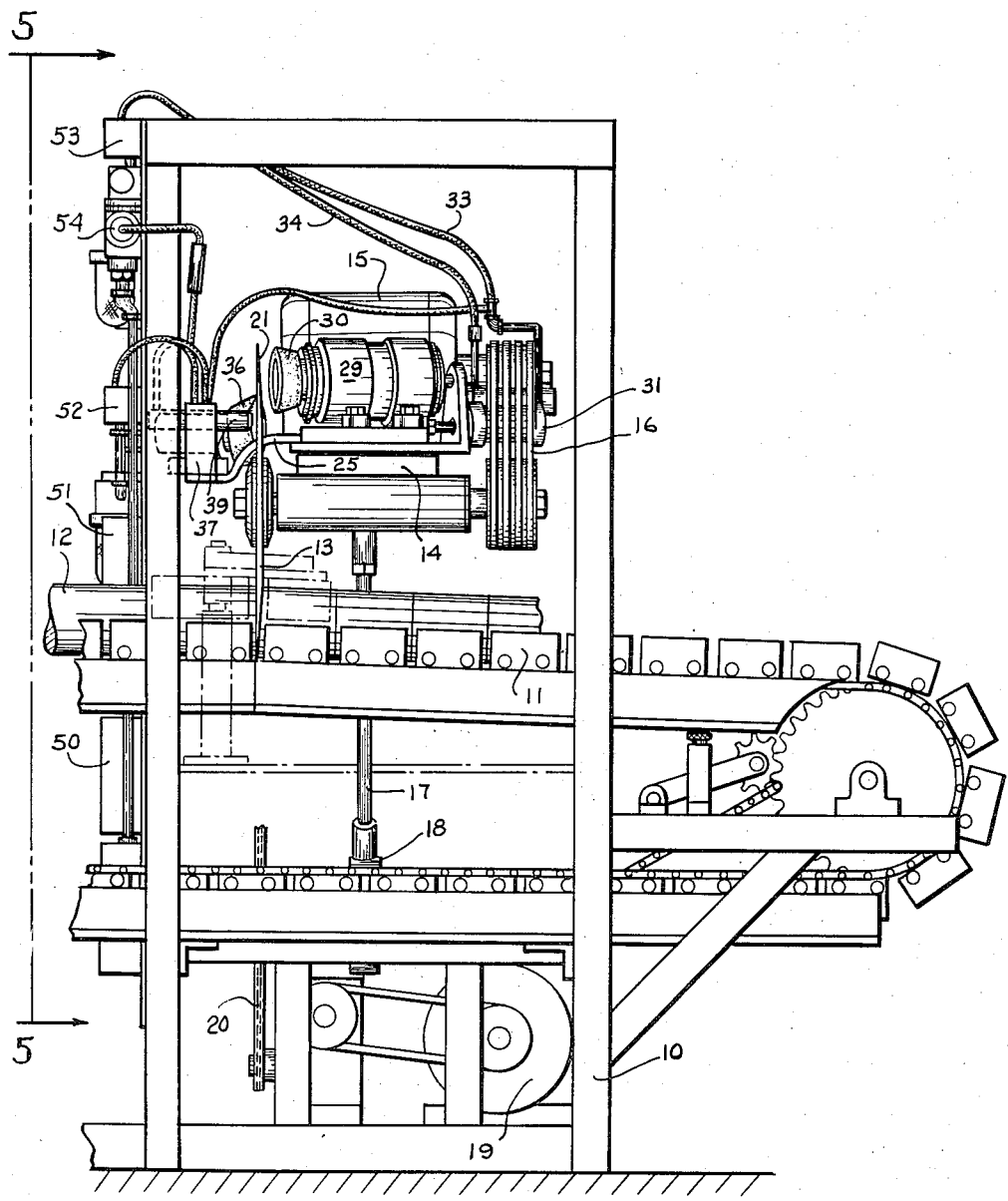
Fig. 1 is a side view showing the invention embodied in an automatic cutting machine.
Figure 2:
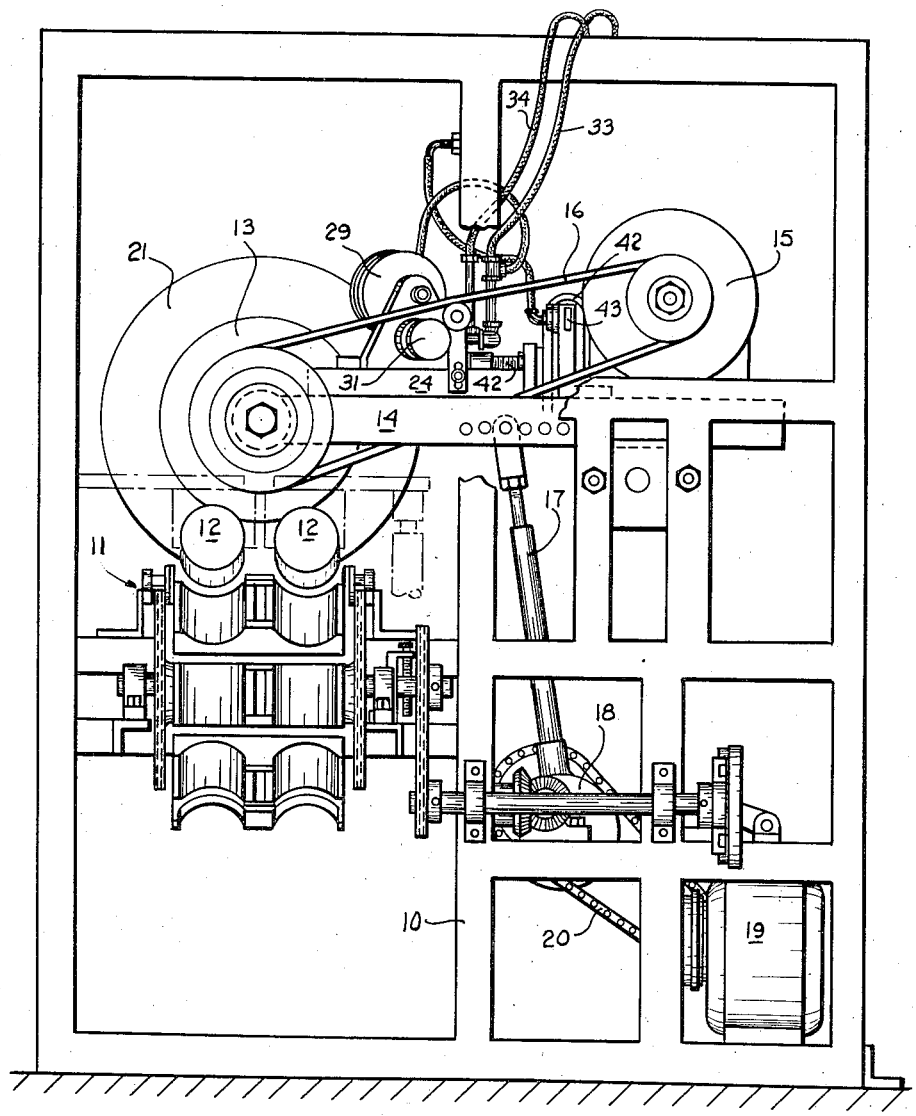
Fig. 2 is an end view of the apparatus shown in Fig. 1.

Referring more particularly to the drawings wherein similar reference characters designate corresponding parts throughout, the automatic cutting machine shown embodying the sharpening apparatus of the present invention comprises a support 10 on which is positioned the endless carrier 11 adapted to carry logs 12 of paper or other material into cutting position relative to rotary cutter 13 by which it is cut into sections of predetermined length.

The rotary cutter 13 is carried by the oscillating support 14 and is adapted to be rotated by motor 15 through belt drive 16.

The carrier or support 11 is adapted to be actuated by a motor to carry the logs into cutting position and to carry the cut sections of the log away from such position.

The cutter support 14 is adapted to be oscillated through drive arm 17 which is oscillated through eccentric 18 which is driven by a motor 19 through chain drive 20.

The foregoing apparatus is shown and described in detail in my Patent No. 2,752,999 referred to above and to which reference is made for such further description thereof as may be necessary.

The cutter 13 is of the type having a bevel 21 on one side thereof only but it will be understood that the invention is applicable to cutters having bevels on either one or both sides thereof as desired.

In the present invention, the carriage 14 for carrying the motor 15 also supports a second carriage which comprises a lateral slide 23 in slideway 24 and to slide 23 is connected the lateral arm 25 having the end portion 26 substantially parallel to slide 23 and slideway 24.

Figures 3, 4:
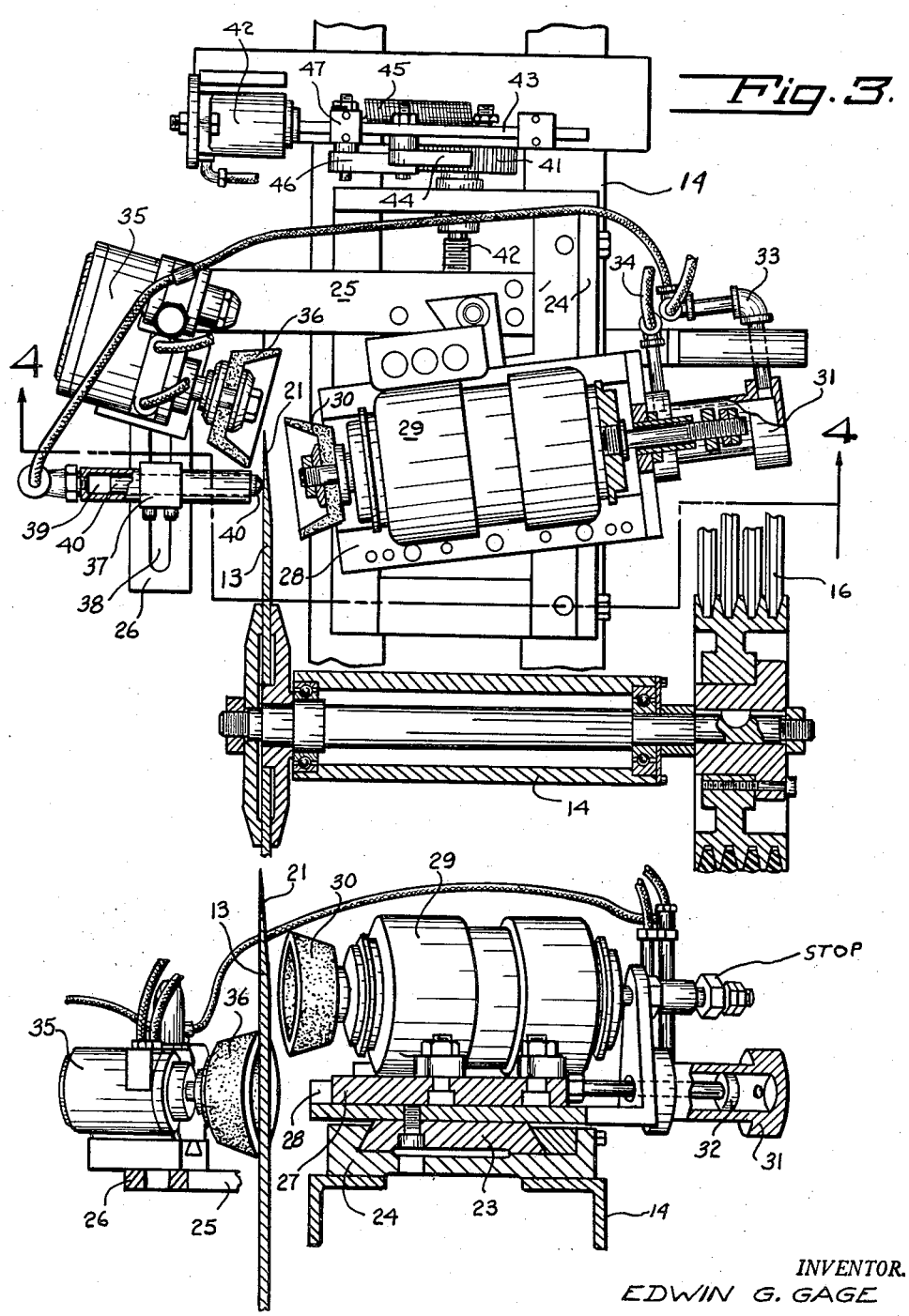
Fig. 3 is a fragmentary top or plan view of the sharpening apparatus.
Fig. 4 is a sectional view taken on line 4—4 of Fig. 3 looking in the direction of the arrows.

On slide 23 is provided cross slide 27 in slideway 28 which, as shown in Fig. 3, extends in a direction lateral to the axis of slide 23 and on slide 27 is carried electric motor 29 having sharpening member 30 on its shaft.

Slide 27 is adjustable in slideway 28 by means of air cylinder 31 in which is positioned piston 32 which is connected to slide 27 on which the motor 29 is mounted. Cylinder 31 has the pneumatic lines 33 and 34 connected thereto adjacent its opposite ends and piston 32 is of the double acting type whereby hydraulic pressure can move slide 27 and motor 29 in opposite directions whereby the slide 27, motor 29 and sharpener 30 may be moved toward cutter 13 for sharpening the cutter and then out of engagement with the cutter.

It will be noted that motor 29 and sharpener 30 are positioned on the side of the cutter 13 having the bevelled edge 21.

On the branch 26 of the carriage is provided an air or pneumatic motor 35 which through suitable gearing rotates sharpener 36 which is positioned on shaft 37 on which is also positioned double acting piston 38 which is positioned in a cylinder and which is connected on the opposite sides of piston 38 to a suitable source of pneumatic pressure.

Adjacent air motor 35 and sharpener 36 on branch 26 is positioned the cutter blade support 37 which is adjustable in slot 38 and which may be locked in adjusted position by a set screw or the like and member 37 is provided with a bore 39 in which is slidably positioned support member 40 which may be moved toward blade 13 by pneumatic pressure in bore 39 behind support member 40.

The carriage comprising slide 23, arm 25 and arm 26 is adapted to be adjusted as a unit toward cutter 13 in order to take up for wear of the cutter by means of a ratchet mechanism comprising ratchet wheel 41 which is connected to screw 42 which is threaded into slide 23, which, as above noted, is rigidly connected through arm 25 to arm 26 whereby both sharpeners 30 and 36 and their respective drives will be moved as a unit simultaneously and to the same extent with reference to the cutter.

Rachet wheel 41 is adapted to be adjusted by pneumatic cylinder 42 which is connected to a source of suitable pneumatic power and contains a cylinder in which is positioned a piston operatively connected to slide 43 on which is carried a dog 44 whereby upon movement of slide 43 by pneumatic motor 42 dog 44 which engages the periphery of ratchet wheel 41 will effect turning movement of said wheel and slide 43 is returned to normal position for further adjustment by spring 45 and the piston in cylinder 42 is also returned through the force of said spring. Dog 46 on support 47 serves to retain ratchet wheel 41 in adjusted position.

It is pointed out that grinding wheel 36 on the side of cutter 13 opposite bevel 21 is rotated, as previously described, only a few times and relatively slowly by means of the air motor 35 and is pushed toward the cutter by a relatively light force or pressure. This wheel 36 is intended only to remove any burrs from its side of the cutter 13 and not for sharpening as is the sharpener or grinder 30 which is rotated at much higher speeds by electric motor 29 and is pushed toward cutter 13 by a much higher pressure.

The mechanism previously described is adapted to be actuated automatically by automatic timing devices with the time to which each of the devices is actuated dependent upon the particular material being cut.

The control arrangement, as shown in Fig. 5, comprises an automatic timing device 50 with solenoid actuated valves 52 and 53 adapted to be actuated periodically at predetermined intervals by said automatic timing device whereby the burring wheel 36 is caused to rotate by air motor 35 and is simultaneously moved toward the edge of the cutting wheel opposite the bevel to remove burrs therefrom, as previously described, and simultaneously with this action, the same automatic timing device energizes motor 29 to effect rotation of sharpener 30 and simultaneously therewith motor 29 and slide 27 are moved toward the adjacent edge of cutter 13 by means of piston 32 in air cylinder 31 and after the sharpening and burring has continued for a predetermined period, the automatic timing apparatus discontinues the energization of the motors 29 and 35 and also effects movement of the wheels 30 and 36 away from the sides of the cutter through the air cylinders and pistons as previously described.

When the grinder 30 is moved toward cutter 13, support 40, on the opposite side of cutter 13, is simultaneously moved toward the cutter to provide backing or support for the cutter during the sharpening or grinding operation.

Periodically, at predetermined intervals, the time depending upon the material being cut and the frequency with which the cutter is sharpened and thereby worn, timing device 51 and solenoid actuated value 54 effects actuation of air cylinder 42 which effects movement of slide 43 which through dog 44 turns ratchet wheel 41 to move the carriage supporting the grinding wheels toward the cutter to compensate for wear on the cutter after which the slide is returned to inactive or normal position.

From the foregoing, it will be seen that I have provided new and improved means for obtaining all of the objects and advantages of the invention.

I claim:

1. In a device of the character described for sharpening a rotary cutter comprising, a support having portions extending on opposite sides of the rotary cutter, motive means carried by said support on opposite sides of said cutter, a sharpener operatively connected to each of said motive means and adapted to be actuated thereby, one of said motive means being pneumatically actuated and the other comprising an electric motor and control means for periodically energizing said motive means, a cutter support member on the side of said cutter opposite said electric motor and means for automatically urging said cutter support member into engagement with the side of said cutter simultaneously with the movement toward the cutter of said sharpener actuated by said electric motor.

2. In a device of the character described for sharpening a rotary cutter comprising, a support having portions extending on opposite sides of the rotary cutter, motive means carried by said support on opposite sides of said cutter, a sharpener operatively connected to each of said motive means and adapted to be actuated thereby, one of said motive means being pneumatically actuated and the other comprising an electric motor and means for moving said electric motor and the sharpener driven thereby radially toward the cutter as a unit and control means for periodically energizing said motive means, a cutter support member on the side of said cutter opposite said electric motor and means for automatically urging said cutter support member into engagement with the side of said cutter simultaneously with the movement toward the cutter of said sharpener actuated by said electric motor.

3. In a device of the character described for sharpening a rotary cutter comprising, a support having portions extending on opposite sides of the rotary cutter, motive means carried by said support on opposite sides of said cutter, a sharpener operatively connected to each of said motive means and adapted to be actuated thereby, one of said motive means being pneumatically actuated and the other comprising an electric motor and means for moving said electric motor and the sharpener driven thereby toward and away from the cutter as a unit, said means comprising a pneumatic motor operatively connected to said electric motor and control means for periodically energizing said motive means, a cutter support member on the side of said cutter opposite said electric motor and means for automatically urging said cutter support member into engagement with the side of said cutter simultaneously with the movement toward the cutter of said sharpener actuated by said electric motor.

4. In a device of the character described for sharpening a rotary cutter comprising, a support having portions extending on opposite sides of the rotary cutter, motive means carried by said support on opposite sides of said cutter, a sharpener operatively connected to each of said motive means and adapted to be actuated thereby, one of said motive means being pneumatically actuated and the other comprising an electric motor and means for moving said electric motor and the sharpener driven thereby toward and away from the cutter as a unit, said means comprising a slideway, a slide in said slideway and operatively connected to said electric motor and means for automatically actuating said slide in said slideway, said means comprising a pneumatic motor operatively connected to said slide and control means for periodically energizing said pneumatic motor, a cutter support member on the side of said cutter opposite said electric motor and means for automatically urging said cutter support member into engagement with the side of said cutter simultaneously with the movement toward the cutter of said sharpener actuated by said electric motor.

5. In a device of the character described for sharpening a rotary cutter comprising, a support having portions extending on opposite sides of the rotary cutter, motive means carried by said support on opposite sides of said cutter, a sharpener operatively connected to each of said motive means and adapted to be actuated thereby, one of said motive means being pneumatically actuated and the other comprising an electric motor and means for moving said electric motor and the sharpener driven thereby toward the cutter as a unit, control means for periodically energizing said motive means and means for periodically moving said support and said sharpeners and motive means toward said cutter as a unit to compensate for wear on said cutter, a cutter support member on the side of said cutter opposite said electric motor and means for automatically urging said cutter support member into engagement with the side of said cutter simultaneously with the movement toward the cutter of said sharpener actuated by said electric motor, means for urging said cutter support toward said blade being pneumatically actuated.

References Cited in the file of this patent

UNITED STATES PATENTS

| | | |
|---|---|---|
| 1,965,696 | Ferris et al. | July 10, 1934 |
| 2,151,669 | Wood et al. | Mar. 21, 1939 |
| 2,207,433 | Haswell | July 9, 1940 |
| 2,766,566 | Gage | Oct. 16, 1956 |